Jan. 22, 1957  M. J. CHARLTON  2,778,400
TRACTION DEVICE FOR PNEUMATIC TIRES
Filed July 6, 1954
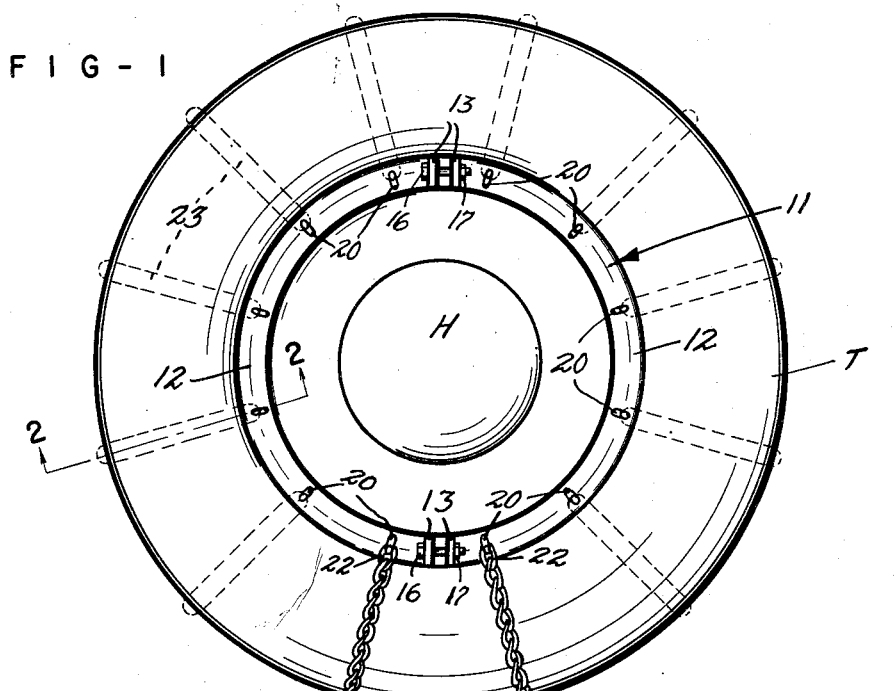
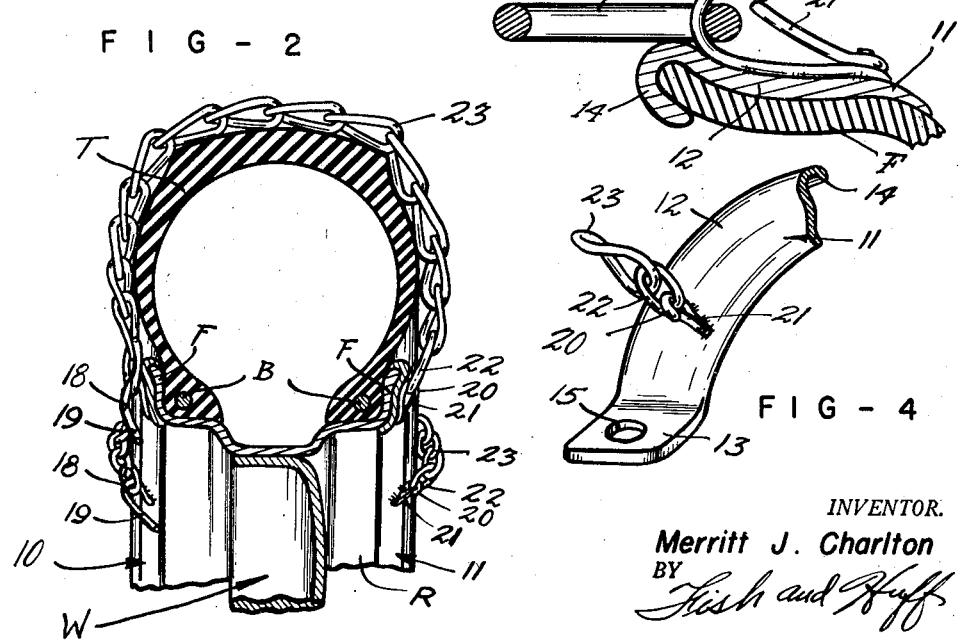
INVENTOR.
Merritt J. Charlton
BY United States Patent Office 2,778,400
Patented Jan. 22, 1957

2,778,400

TRACTION DEVICE FOR PNEUMATIC TIRES

Merritt J. Charlton, Spokane, Wash.

Application July 6, 1954, Serial No. 441,408

1 Claim. (Cl. 152—236)

The present invention relates to certain new and useful improvements in attachable and detachable traction devices having means mounted on inner and outer sides of a vehicle wheel rim whereby cross chains may be attached and detached without having to move the vehicle.

The invention consists of inner and outer anchor rings releasably secured to the rim of a vehicle wheel and which are provided for connecting the ends of a plurality of cross chains; and the ends of the cross chains extend to opposite sides of the tire and are releasably secured to hooks carried by the anchor rings which are each formed from opposed semi-circular sections secured together and releasably fastened to the rim by means of clamping members. The tire traction device so constructed affords the necessary traction by applying for the time being any number of cross chains found necessary to increase the traction of the tire under the then encountered adverse traction conditions.

An object of the invention is to provide a traction device which will permit traction elements to be applied or removed from a wheel without the necessity of raising the wheel from the ground.

A further object is to eliminate the necessity of passing any cross chains beneath the tire, therefore it is not necessary to move the vehicle to apply the traction elements since each cross chain is applied individually.

A further object of the invention is to provide a traction device wherein the anchoring means remains fixed to the wheel at all times so that any number of cross chains desired may be applied as found necessary.

These and other objects of the invention will become apparent during the course of the following description.

The invention consists in certain novel features of construction and combinations of parts which will be hereinafter described and more particularly pointed out in the claim. In the accompanying drawings, forming a part of this specification and in which like numerals are employed to designate like parts, Figure 1 is a view of a vehicle wheel in side elevation showing the invention applied to the outer side of the rim and having a number of cross chains applied thereto;

Figure 2 is a transverse cross section taken at line 2—2 of Figure 1;

Figure 3 is a detailed fragmentary cross section upon an enlarged scale showing one of the outer ring snap hooks and associated parts; and, Figure 4 is a fragmentary perspective view of one end of an outer ring semi-circular section.

Referring now more particularly to the drawings, in Figure 1, I have disclosed a conventional automobile wheel W having the usual hub cap H and including the annular drop center rim R. It will be noted in Figure 2 that the conventional rim R is provided with annular outstanding flanges F adapted to confine the inner annular beads B of pneumatic tire T. The peripheral edges of these flanges F are employed to secure the inner and outer annular anchor rings 10 and 11. Excepting in the hook construction, the inner annular ring 10 is identical with that of the outer ring 11 and therefore the description of one will suffice for a proper understanding of both.

Each anchor ring 11 is formed of a pair of semi-circular sections 12 which have outstanding ears 13 on their ends and those of the same ring being substantially diametrically opposed one to the other. On its outer edge each section, when viewed in cross section, is seen to have a substantially semi-circular annular bead 14 which is adapted to hook over the edge of the rim flange F. The outstanding ears 13 are drilled at 15 to receive clamping bolts 16 which extend through aligned openings 15 of companion ears 13 on opposed ring sections 12 and clamping nuts 17 are provided to clamp the semi-circular sections 12 together to form the complete anchor ring 11 which is seen to be hooked over the edge of the flange F in Figures 2 and 3. It is obvious thus far that the anchor rings 11 are secured relative to the rims R, concentric therewith and may be manually removed when desired.

Referring now more particularly to Figure 2 it will be seen that the inner ring 10 is provided with a plurality of circumferentially spaced hooks 18 and these hooks are welded or otherwise secured to the ring 10 and have elongated bills 19 which extend inwardly toward the axis of the ring 10.

Outer ring 11 is provided with a plurality of circumferentially spaced snap hooks 20 which have the conventional depressable snaps 21 each adapted to confine the end one of the links of a cross chain 23 against accidental removal. It will be understood that I use the term cross chain in this specification and the appended claim generically to include any similar device adapted to cross the tread of a tire and provide additional traction such as cable, and do not wish to be limited only to a chain having a plurality of interconnected links.

To apply one or more of the cross chains 23 it is only necessary for one to crouch beside the vehicle wheel, reach to the inner side thereof and hook the end one of the links forming the cross chain 23 over the elongated bill 19 of a hook 18, draw the chain across the tread of the pneumatic tire T and hook the opposed end onto the axially aligned snap hook 20 on the outer ring 11. Obviously, any number of cross chains desired may be applied in this manner to provide the traction necessary under the circumstances.

Having thus described my invention, I claim:

A traction device for a pneumatic tire having an annular rim, comprising inner and outer anchor rings, each said ring consisting of opposed, semi-circular sections having out-turned ears at the ends thereof and having a cross sectional configuration terminating in an outwardly disposed, semi-circular bead adapted to hook over the annular rim edge, means clamping companion ones of said ears together for releasably securing the anchor rings to the inner and outer sides of said rim, the inner one of said rings being provided with a plurality of circumferentially spaced hooks having elongated bills extending inwardly toward the axis of said rim, the outer one of said rings having a plurality of circumferentially spaced snap hooks, and cross chains extending across the tread of the tire and releasably anchored at opposed ends to said hooks.

References Cited in the file of this patent

UNITED STATES PATENTS

| | | |
|---|---|---|
| 1,328,298 | Rogers | Jan. 20, 1920 |
| 1,618,156 | Foster | Feb. 15, 1927 |
| 2,681,094 | Donaldson | June 15, 1954 |